United States Patent [19]

Usui

[11] Patent Number: 5,239,683
[45] Date of Patent: Aug. 24, 1993

[54] CELLULAR TELEPHONE SYSTEM CAPABLE OF REDUCING IM DISTORTION AT PORTABLE TELEPHONE

[75] Inventor: Hisayoshi Usui, Tokyo, Japan

[73] Assignee: NEC Corporation, Tokyo, Japan

[21] Appl. No.: 606,998

[22] Filed: Oct. 31, 1990

[30] Foreign Application Priority Data

Oct. 31, 1989 [JP] Japan .................. 1-283848

[51] Int. Cl.$^5$ .............................................. H04B 1/10
[52] U.S. Cl. .................................. 455/63; 455/69; 455/88; 455/254; 455/296
[58] Field of Search ............. 455/33.1, 63, 67.3, 455/89, 127, 254, 295, 296, 316, 317, 343, 234.1, 234.2, 245.1, 250.1, 70, 71, 69; 379/59, 60, 79; 330/285, 129, 297, 127

[56] References Cited

U.S. PATENT DOCUMENTS

| | | | |
|---|---|---|---|
| 2,844,712 | 7/1958 | Noizeux | 455/127 |
| 4,121,161 | 10/1978 | Ohsawa | 325/404 |
| 4,890,300 | 12/1989 | Andrews | 455/63 |
| 5,093,924 | 3/1992 | Toshiyuki et al. | 455/33 |

FOREIGN PATENT DOCUMENTS

| | | |
|---|---|---|
| 0244872 | 11/1987 | European Pat. Off. . |
| 0265943 | 4/1988 | European Pat. Off. ............ 455/89 |
| 0283955 | 9/1988 | European Pat. Off. . |
| 0366485 | 5/1990 | European Pat. Off. . |
| 0170127 | 5/1989 | Japan .............................. 455/63 |
| 2223146 | 3/1990 | United Kingdom ............... 455/254 |

OTHER PUBLICATIONS

W. C. Jakes, Jr., "Microwave Mobile Communications," published by John Wiley & Sons, 1974, pp. 281–287.

Primary Examiner—Reinhard J. Eisenzopf
Assistant Examiner—Hguyen Vo
Attorney, Agent, or Firm—Sughrue, Mion, Zinn, Macpeak & Seas

[57] ABSTRACT

A cellular telephone system includes a plurality of base stations which cover a plurality of cells. The system also includes a plurality of portable telephones communicable with the base station over radio frequency channels. A base station covering a given cell transmits an IM control signal indicating that there exists IM interference in the given cell. In response to the IM control signal, each of the portable telephones reduces its receiver sensitivity, so that the IM interference can be alleviated.

2 Claims, 6 Drawing Sheets

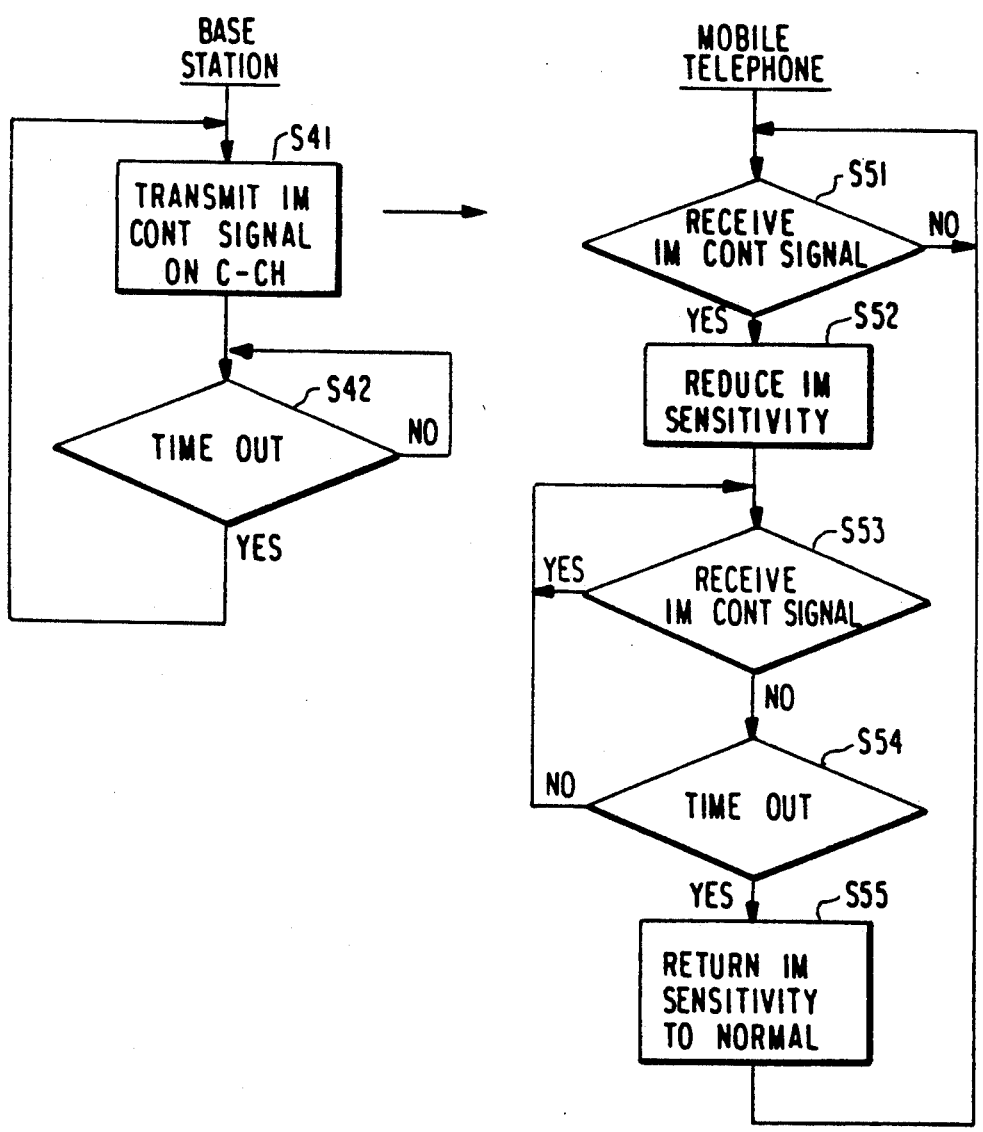

CELLULAR TELEPHONE SYSTEM CAPABLE OF REDUCING IM DISTORTION AT PORTABLE TELEPHONE

BACKGROUND OF THE INVENTION

The present invention relates to a cellular telephone system and, more particularly, to a cellular telephone system having some cells in which intermodulation (IM) interference occurs.

A cellular telephone system includes a plurality of base stations covering a plurality of zones, or cells, respectively. While radio frequencies are assigned to each base station so that no interference occurs, IM, or cochannel, interference cannot be completely eliminated. Furthermore, this situation would be aggravated by introducing a new system into an area covered by the existing system. Especially, when the two base stations of the new and existing systems, which use adjacent radio frequencies, are installed in the same cell, IM interference is likely to occur. If a portable, or mobile, telephone receives at least two radio frequencies adjacent to each other, IM interference may occur.

SUMMARY OF THE INVENTION

An object of the present invention is, therefore, to provide a cellular telephone system capable of reducing intermodulation (IM) interference at a portable, or mobile telephone.

Another object of the present invention is to provide a portable, or mobile telephone for use in a cellular telephone system and capable of reducing IM interference by reducing its IM sensitivity.

Yet another object of the present invention is to provide a portable, or mobile, telephone capable of not only alleviating IM interference but also having a wider communications area.

According to the present invention, there is provided a cellular telephone system comprising a plurality of base stations which cover a plurality of cells. The system also includes a plurality of portable, or mobile, telephones communicable with the base stations over radio frequency channels. A base station covering a given cell transmits an IM control signal indicating that there exists IM interference in the given cell. In response to the IM control signal, each of the portable telephones reduces its sensitivity, so that the IM interference can be alleviated.

BRIEF DESCRIPTION OF THE DRAWINGS

The above and other objects, features and advantages of the present invention will become more apparent from the following description referring to the accompanying drawings, in which:

FIGS. 8, 9 and 10 are flow charts describing the operations of the FIG. 3 base station and the FIG. 4 portable telephone.

DETAILED DESCRIPTION OF THE PREFERRED EMBODIMENTS

Figure 1:
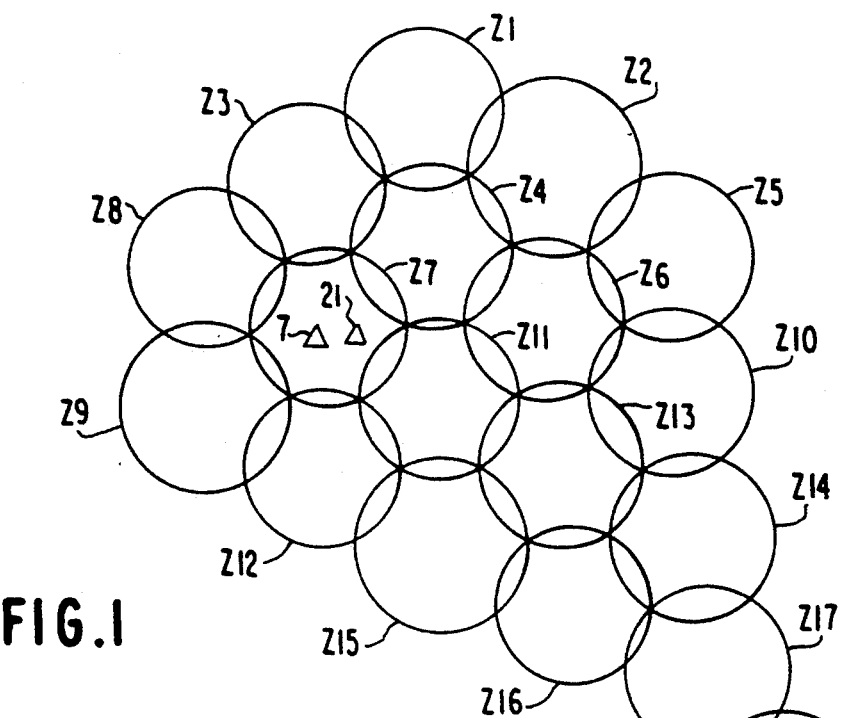
FIG. 1 shows an illustration of a cellular telephone system to which the present invention is applicable.

To better understand the present invention, problems pertaining to a conventional cellular telephone system will first be described referring to FIGS. 1 and 2. In FIG. 1, cellular telephone system has a service area which is divided into a plurality of cells Z1-Z20. A plurality of base stations are installed in the cells Z1-Z20, respectively. For example, a base station 7 is installed in the cell Z7 to cover that cell. Although radio frequency channels are assigned to each base station so that no interference occurs, IM interference cannot completely be eliminated, as mentioned earlier.

Furthermore, in some countries, two cellular telephone systems are allowed to be installed in a single area. Aside from the existing system, a new system is introduced into the single area. In this situation, two base stations may exist in a cell. In the cell Z7, for instance, the existing station 7 and a new one 21 coexist. If these two base stations use radio frequencies adjacent to each other, IM interference may occur at a portable telephone in the cell Z7.

Figure 2:
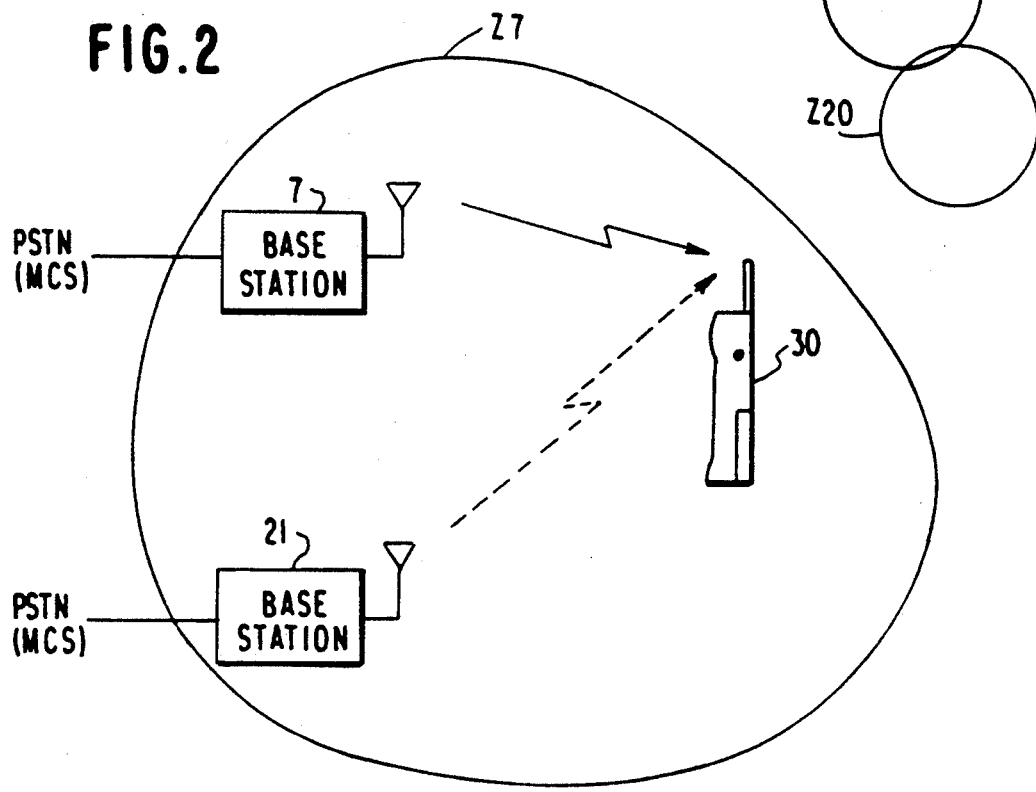
FIG. 2 is a schematic block diagram showing part of the FIG. 1 system.

More definitely, in FIG. 2, a portable, or mobile telephone 30 in the cell Z7 receives radio frequencies from the base station 21 as well as the base station 7, which stations are coupled to a public switching telephone network (PSTN) through a mobile control station (MCS). When the received frequencies are near, IM interference is very likely to occur due to the nonlinearity of portable telephone 30. The present invention is mainly aimed at alleviating such IM interference.

According to the present invention, the base station 7 detects in advance whether IM interference exists in the cell Z7. If IM interference exists in a given radio frequency channel, the base station informs the portable telephone 30 of the existance of IM interference. In response, the portable telephone 30 decreases its IM sensitivity by reducing a vias voltage applied to its radio frequency (RF) amplifier and/or frequency mixer. By reducing the IM sensitivity, IM interference can be alleviated.

When the portable telephone 30 is in a cell Z20, no IM interference would occur. In this case, the portable telephone 30 makes the IM sensitivity normal, resulting in obtaining a wider communicable area.

Figure 3:
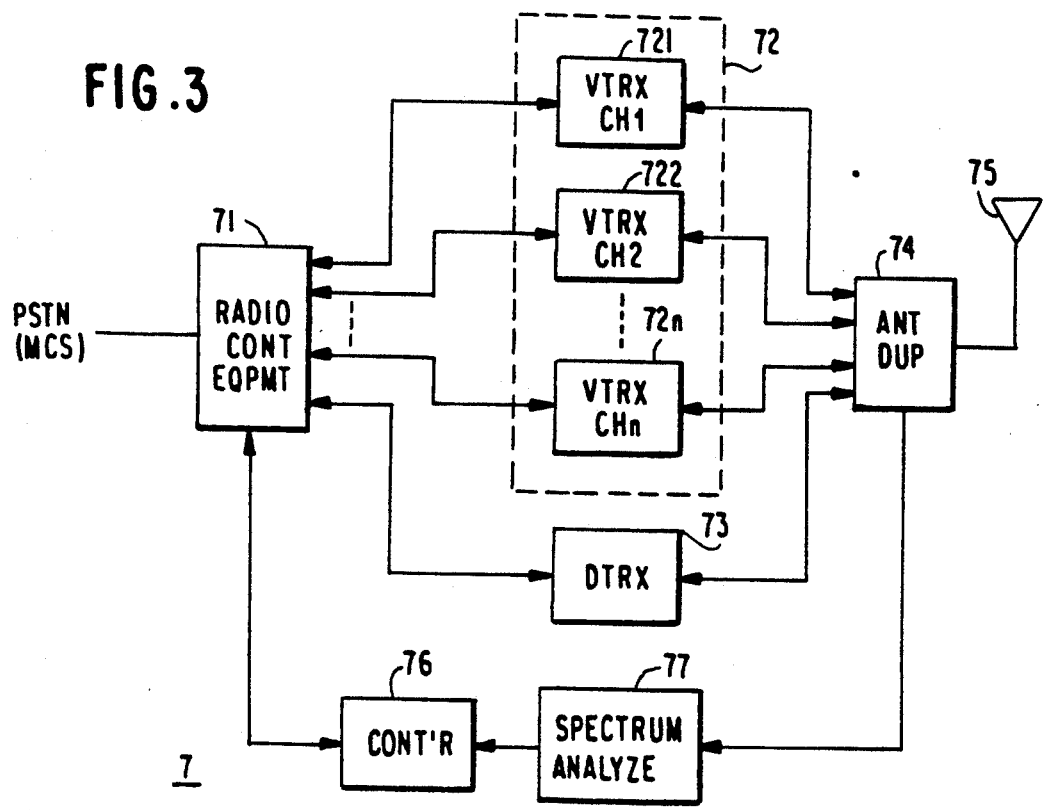
FIG. 3 is a schematic block diagram showing a base station according to the present invention.

In FIG. 3, a base station 7 includes a plurality of voice transmitter/receiver (VTRX) units 721-72n (n is a positive integer) which respectively correspond to a plurality of speech, or voice, radio frequency channels assigned to the base station 7. The base station 7 also includes a data transmitter/receiver (DTRX) unit 73 which corresponds to a control radio frequency channel and transmits and receives control signals to and from portable telephones within a cell Z7 covered by the station 7. The VTRX and DTRX units are coupled to an antenna 75 via an antenna duplexer 74 and to radio control equipment 71 which in turn is coupled to PSTN through a mobile control station (MCS). The above-mentioned construction of the base station is well known in the art and thus no further description thereof will be provided in this specification.

The base station further includes a spectrum analyzer 77 and a controller 76 between the radio control equipment 71 and the antenna duplexer 74. The spectrum analyzer 77 receives and analyzes radio frequencies which include at least the radio frequencies assigned to the base station 7. The analyzed result is supplied to the controller 76 whose operation flow is shown in FIG. 6.

Figure 6:
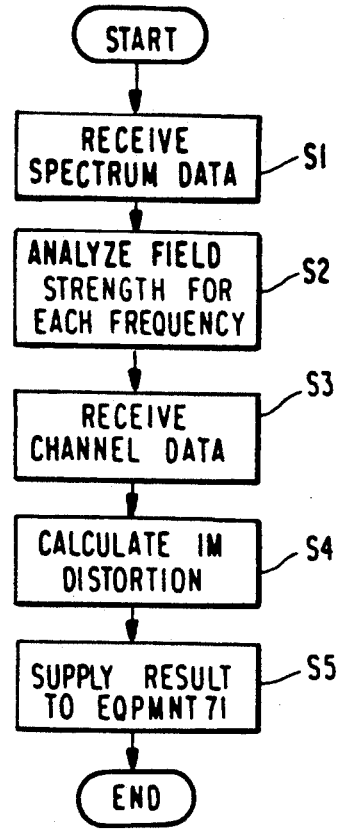
FIG. 6 shows a flow chart describing the IM interference measuring operation of the FIG. 3 base station.

In FIG. 6, the controller 76 receives at step S1 the analyzed result from the spectrum analyzer 7. Then, the controller 76 determines at step S2 field strength for each frequency to be analyzed, based on the analyzed result. After receiving channel frequency information from the control equipment 71 at step S3, the controller 76 calculates IM distortion with respect to each radio channel, based on the determined field strength and on the channel frequency information (see step S4). For further information about the calculation of IM distortion, reference is made to "*Microwave Mobile Communications*," pp .281-287, by William C. Jakes, Jr., published by John Wiley & Sone, 1974, which is incorporated into this specification. At step S5, the controller 76 supplies to the radio control equipment 71 the calculated result indicating whether IM interference is detected or not. If IM interference is detected, the control equipment 71 transmits to a portable telephone via DTRX or VTRX unit an IM control signal indicating that there exists IM interference, which will be described in detail later.

Figure 4:
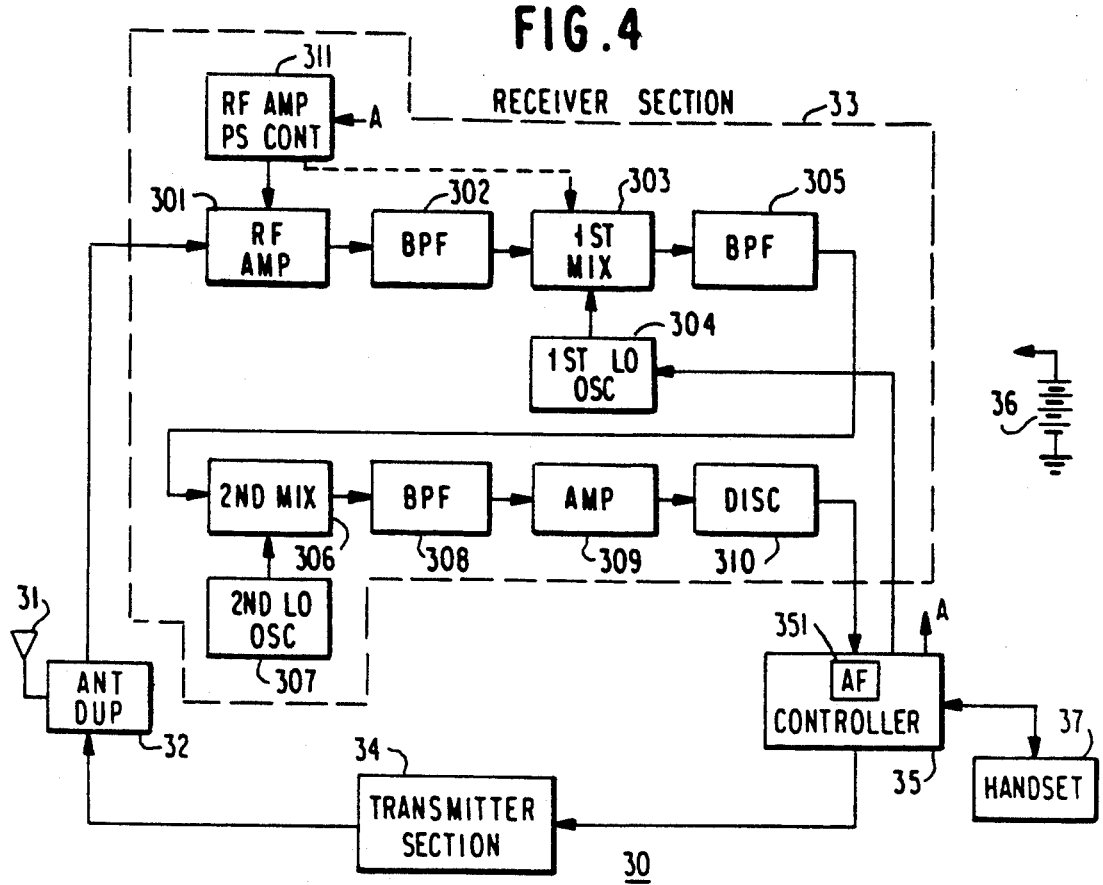
FIG. 4 is a schematic block diagram showing a portable telephone according to the present invention.

In FIG. 4, a portable telephone 30 includes a receiver section 33 connected to an antenna 31 through an antenna duplexer 32. The output of receiver section 33 is fed to a controller 35 to which a handset 37 and a transmitter section 34 are also coupled. The transmitter section 34 is connected to the antenna 31 through the antenna duplexer 32. An audio frequency (AF) gate 351 within controller 35 couples the receiver section 33 and the transmitter section 35 to the handset 37. The telephone 30 further includes a battery 36 applying a direct current (DC) voltage to various parts of telephone 30 but their connections are omitted for simplicity.

The antenna 31 picks up a radio frequency (RF) signal and supplies it to an RF amplifier 301 in the receiver section 33. The RF amplifier 301 amplifies the supplied RF signal and supplied the amplified signal through a band-pass filter (BPF) 302 to a first frequency mixer 303 to which a first local oscillation signal is also supplied from a first local oscillator 304. The local oscillator 304 may comprise a frequency synthesizer whose output frequency can be changed in accordance with a channel designate signal from the controller 35. The first frequency mixer 303 frequency mixes the RF signal and the first local oscillation signal to produce a first intermediate frequency (IF) signal.

The first IF signal is supplied to a second frequency mixer 306 through an IF BPF 305. The second frequency mixer 306 also receives a second local oscillation signal from a second local oscillator 307 and frequency combines the first IF signal and the second local oscillation signal to produce a second IF signal. The second IF signal is supplied through a BPF 308 to an amplifier 309 to be amplified. The amplified signal is supplied to a frequency discriminator 310 which frequency discriminates the amplified signal to produce a baseband signal. The frequency discriminator 310 may be replaced by other type of demodulators in accordance with the modulation methods of received signals. The baseband signal includes either a voice signal or a control signal and is fed to the controller 35. The voice signal is ronted to the handset 37 via the AF gate 351.

An audio signal is inputted from the handset 37 and supplied to the transmitter 34 through the AF gate 351. A control signal is also supplied to the transmitter 34 from the controller 35. The transmitter 34 transmits the supplied signals over a radio frequency signal via the antenna duplexer 32 and antenna 31. The transmitter 34 may tune itself to a radio channel designated by a channel designate signal from the controller 35. The foregoing operation of portable telephone 30 is known in the art and thus no further description will be given here.

When the controller 35 receives an IM control signal indicating that IM interference exists, the controller 35 causes an RF amplifier power supply (PS) controller 311 to reduce a DC bias voltage supplied to the RF amplifier 301, so that the sensitivity of receiver section 33 is reduced. The reduction in the sensitivity can alleviate IM interference. The PS controller 311, which will be described later, is applied with a DC voltage from the battery 36 and is under the control of controller 35 by means of a line indicated by a level "A."

Figure 7:
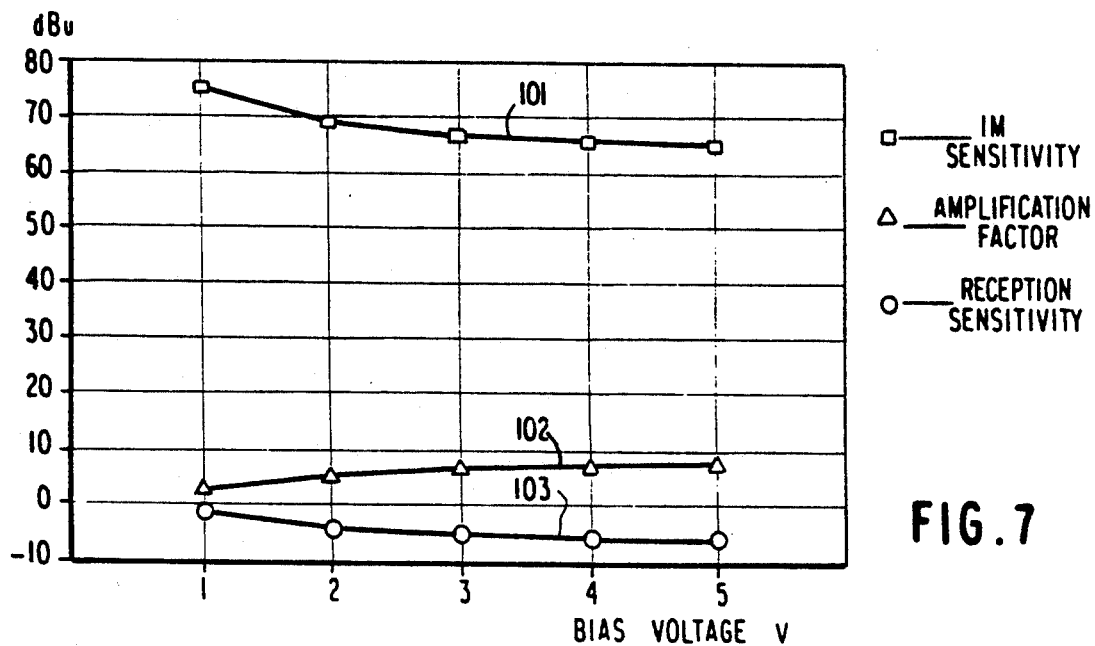
FIG. 7 is a graph showing the characteristics of RF amplifier bias voltage vs. IM sensitivity, amplification factor and reception sensitivity.

Referring to FIG. 7, when a bias voltage to the RF amplifier 301 increases, all the IM and reception sensitivities 101 and 103 and the amplification factor, or gain, 102 of RF amplifier 301 increase. Whereas when the bias voltage decreases, the IM sensitivity 101 also decreases, so that IM interference can be eased.

Returning to FIG. 4, a bias voltage to the first frequency mixer 303 may be changed in addition to or instead of the bias voltage to the RF amplifier 301. This bias voltage change of the mixer 303 will provide effect similar to that obtained by charging the bias voltage to the RF amplifier 301.

Figures 5A, 5B:
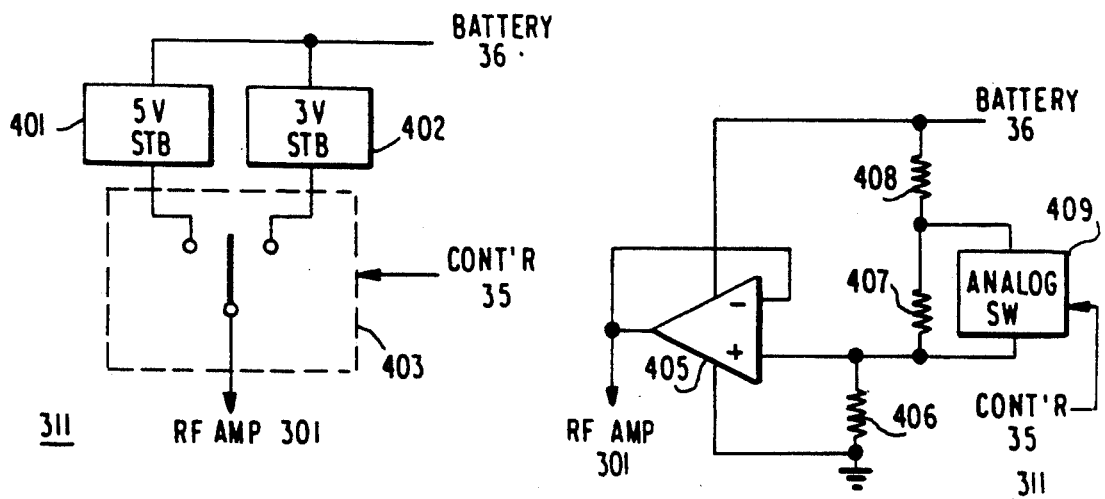
FIGS. 5A and 5B are schematic diagrams showing specific circuits of an RF amplifier power supply controller 311 shown in FIG. 4.

In FIG. 5A, the PS controller 311 includes a lower (3 V) and higher (5 V) voltage stabilizers 402 and 401 whose output voltages are selectively applied to the RF amplifier 301 by means of a switching circuit 403. More specifically, when IM interference exists, the controller 35 causes the switching circuit 403 to connect the lower voltage stabilizer 402 to the RF amplifier 301. On the other hand, when no IM interference exists, the controller 35 causes the switching circuit 403 to connect the higher voltage stabilizer 401 to the RF amplifier 301.

In FIG. 5B, the PS controller 311 includes an operational amplifier 405 to which a DC voltage is applied from the battery 36. The inverting input of amplifier 405 is connected to the output of same and to the RF amplifier 301. The non-inverting input of amplifier 405 is connected to one end of a resistor 406 the other end of which is grounded. The non-inverting input is also connected to one end of a resistor 407 the other end of which is connected to one end of a resistor 408. An analog switch 409 is connected in parallel with the resistor 407. The other end of resistor 408 is coupled to the battery 36.

In operation, when IM interference exists, the controller 35 renders the switch 409 open so that the output voltage of amplifier 405 decreases. Whereas in no existance of IM interference, the controller 35 renders the switch 409 closed so that the amplifier 405 output voltage is maintained to be a normal level.

Figure 8:
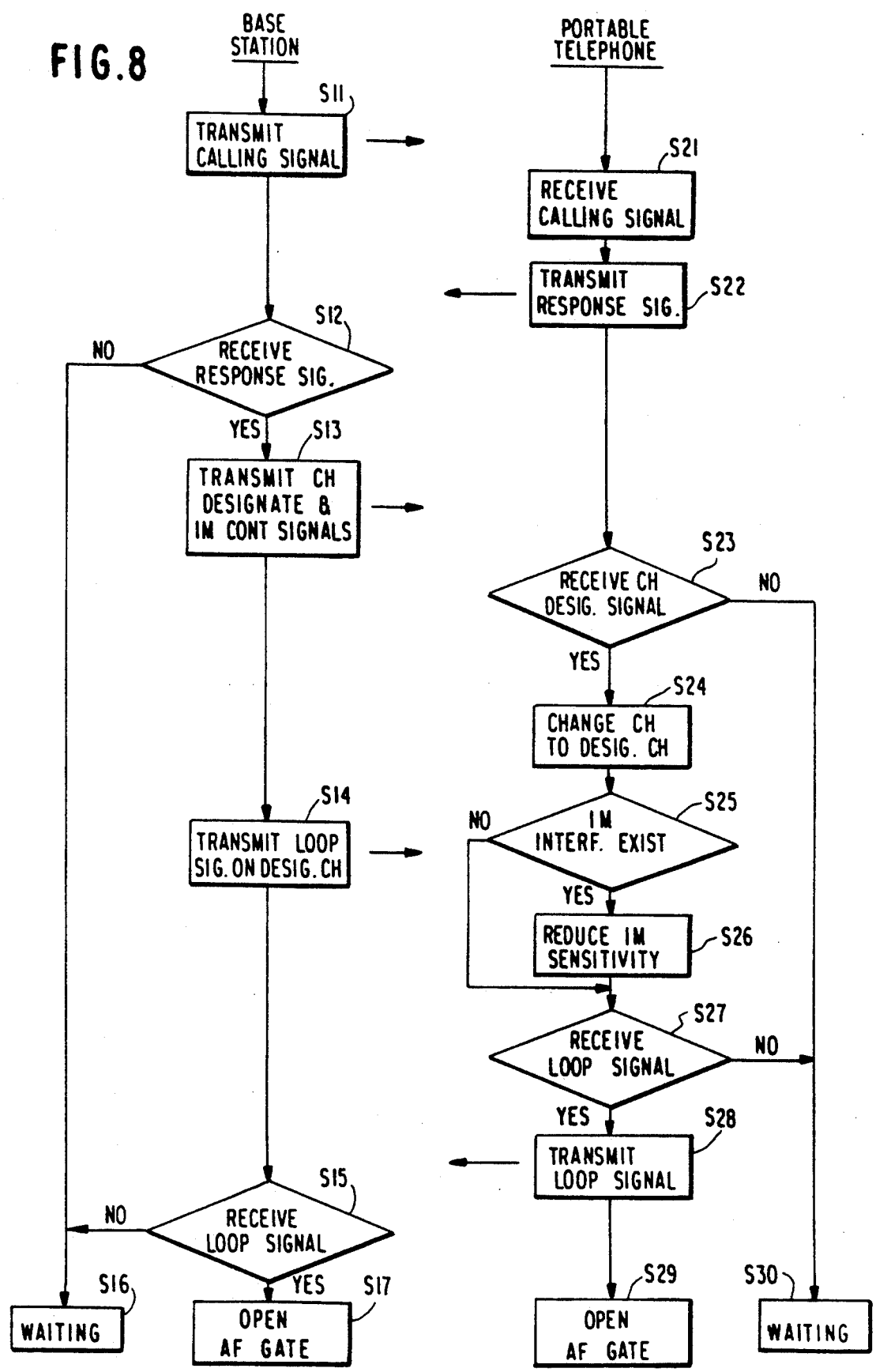

In FIG. 8, if a base station receives from a PSTN a call to be sent to a portable telephone, the base station transmits a calling signal to the portable telephone over a control radio channel at step S11. The portable telephone which is waiting on the control radio channel receives the calling signal and in response thereto returns a response signal to the base station at steps S21 and S22. The base station check at step S12 if it receives the response signal. If not, the base station goes to a waiting state (step S16). If receiving the response signal, the base station transmits to the portable telephone at step S13 a channel designate signal designating a speech radio channel to be used for conversation between the base station and the portable telephone. At the same time, if IM interference exists in the designated channel, the base station sends to the portable telephone an IM control signal indicating that the designated speech channel is affected by the IM interference. After step S13, the base station transmits a loop check signal to the portable telephone over the designated speech channel.

At step S23, the portable telephone sees if it receives the channel designate signal. If not, the telephone proceeds to a waiting state (step S30). If receiving the channel designate signal, the telephone tunes the transmitter and receiver sections 34 and 33 (see FIG. 4) to a speech channel designated by the channel designate signal. Thereafter, the telephone checks at step S25 if the IM control signal is received. If it is received, the telephone reduces the bias voltage to the RF amplifier 311 (FIG. 4), i.e., reduces the IM sensitivity at step S26. If no IM control signal is received and after step S26, step S27 is performed to see if the portable telephone receives the loop check signal. If no loop check signal is received, the telephone goes to step S30 to enter the waiting state. Otherwise, the telephone returns the loop check signal to the base station step S28 and then opens the AF gate to begin conversation at step S29.

The base station checks at step S15 if the loop check signal is returned. If not, the base station moves on to step S16 to enter the waiting state. If receiving the returned loop check signal, the base station opens the AF gate of the VTRX corresponding to the designated speech channel to start conversation.

Figure 9:
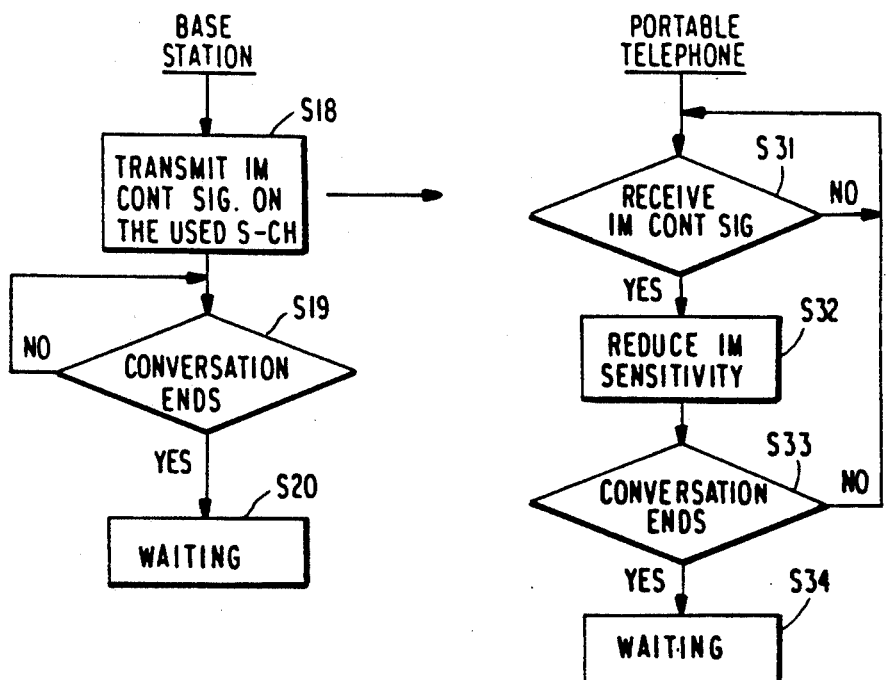

The portable telephone may travel during conversation from one cell in which there is no IM interference to another cell in which there is IM interference. In this case, the operation shown in FIG. 9 will be performed. In FIG. 9, the base station transmits an IM control signal over a designated speech channel at step S18 to the portable telephone which is engaged in conversation with the base station over the designated speech channel. The IM control signal is superimposed on a voice signal transmitted over the designated speech channel. Step S18 is followed by step S19 at which the base station checks if the conversation ends. If yes, the base station returns to a waiting state (step S20). The portable telephone checks at step S31 if it receives the IM control signal on the designated speech channel. If yes, the telephone reduces the sensitivity of receiver section 33, so that IM interference is alleviated. Step S32 is followed by step S33 at which the telephone sees whether conversation ends or not. If so, the telephone goes into a waiting state. If the answer at step S31 or S33 is negative, the operation returns to step S31.

FIG. 10 is a flow chart of another embodiment of the present invention which shows how the base station informs the portable telephone that IM interference exists. In FIG. 10, the base station periodically transmits on a control radio channel an IM control signal (see steps S41 and S42). The portable telephone monitors the control radio channel to see at step S51 if the telephone receives the IM control signal. If yes, the telephone reduces its receiver sensitivity at step S52. Then, the telephone monitors again the control radio channel at step S53 to see if it receives an IM control signal. If the telephone receives no IM control signal within a predetermined period of time (see step S54), it resumes the sensitivity at step S55 from which the operation returns to step S51.

What is claimed is:
1. A mobile telephone comprising:
   a means for receiving a radio frequency signal to produce a received signal;
   RF amplifier means for amplifying said received signal to produce an amplified signal;
   means for demodulating said amplified signal to produce a baseboard signal;
   means for detecting from said baseband signal a control signal indicating that there is intermodulation interference; and
   power supply means responsive to said control signal for reducing the gain of said RF amplifier means;
   battery means for applying a DC voltage to said telephone, wherein said power supply means comprises:
   an operational amplifier supplied with said DC voltage as a drive voltage, the inventing input and output of said operational amplifier being connected to said RF amplifier means;
   a first resistor connected between the non-inverting input of said operational amplifier and ground;
   a second resistor connected between said non-inverting input and said battery; and
   a switch connected in parallel with said second resistor, said switch being open in the presence of said control signal and being closed in the absence of said control signal.

2. A telephone as claimed in claim 1, wherein said switch comprises an analog switch.

* * * * *